United States Patent [19]

DiBianca et al.

[11] Patent Number: 4,525,628
[45] Date of Patent: Jun. 25, 1985

[54] RARE EARTH CERAMIC SCINTILLATOR

[75] Inventors: Frank A. DiBianca, Chapel Hill, N.C.; Jean-Pierre J. Georges, Waukesha, Wis.; Dominic A. Cusano; Charles D. Greskovich, both of Schenectady, N.Y.

[73] Assignee: General Electric Company, Waukesha, Wis.

[21] Appl. No.: 389,828

[22] Filed: Jun. 18, 1982

[51] Int. Cl.³ .................. G01T 1/202; C09K 11/46
[52] U.S. Cl. .................. 250/367; 250/361 R; 250/483.1; 252/301.4 R
[58] Field of Search ............ 378/19; 250/361 R, 367, 250/486.1, 483.1, 363 R, 366; 252/301.4 R

[56] References Cited

U.S. PATENT DOCUMENTS

| | | | |
|---|---|---|---|
| 3,545,987 | 12/1970 | Anderson | 106/39 |
| 3,640,887 | 2/1972 | Anderson | 252/301.1 |
| 3,666,676 | 5/1972 | Rabatin et al. | 252/301.4 R |
| 3,842,012 | 10/1974 | Hoppenbrouwers | 252/301.4 R |
| 4,032,471 | 6/1977 | Luckey | 252/301.4 R |
| 4,224,524 | 9/1980 | Suys et al. | 250/486 |
| 4,225,653 | 9/1980 | Brixner | 428/539 |
| 4,242,221 | 12/1980 | Cusano et al. | 252/301.4 H |
| 4,317,037 | 2/1982 | Suzuki et al. | 250/367 |
| 4,421,671 | 12/1983 | Cusano et al. | 250/483.1 |

FOREIGN PATENT DOCUMENTS 1364008 8/1974 United Kingdom .

OTHER PUBLICATIONS

Carnall et al., "Transparent $Gd_2O_3$ Ceramics and Phosphors", Mat. Res. Bull., vol. 7, pp. 647–654, 1972, Pergamon Press.
Lefever et al., "Transparent Yttrium Oxide Ceramics", 1967, Mat. Res. Bull., vol. 2, Pergamon Press, pp. 865–869.
Buchanan et al., "Cathodoluminescent Properties of the Rare Earths in Yttrium Oxide", *Journal of Applied Physics*, vol. 39, No. 9, Aug. 1968, pp. 4342–4347.
Rhodes, "Controlled Transient Solid Second-Phase Sintering of Yttria", *Journal of the American Ceramic Society-Rhodes*, vol. 64, No. 1, Jan. 1981, pp. 13–19.

Primary Examiner—Alfred E. Smith
Assistant Examiner—Carolyn E. Fields
Attorney, Agent, or Firm—Leydig, Voit, Osann, Mayer & Holt, Ltd.

[57] ABSTRACT

An improved scintillator for a solid state radiation detector useful in CT (computed tomography), DR (digital radiography), and related technologies. The scintillator, rather than being grown as a single crystal, is formed by means of hot pressing or sintering, as a polycrystalline ceramic. Rare earth oxides doped with rare earth activators are selected to yield a cubic crystal structure of high density and transmittance, which satisfies radiation detector requirements better than crystals utilized heretofore.

8 Claims, 3 Drawing Figures

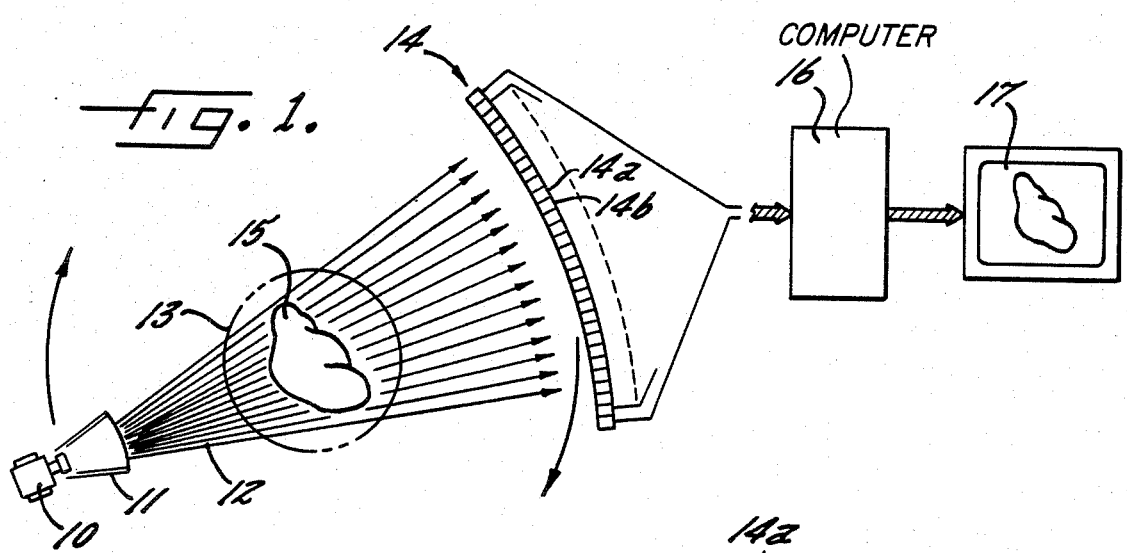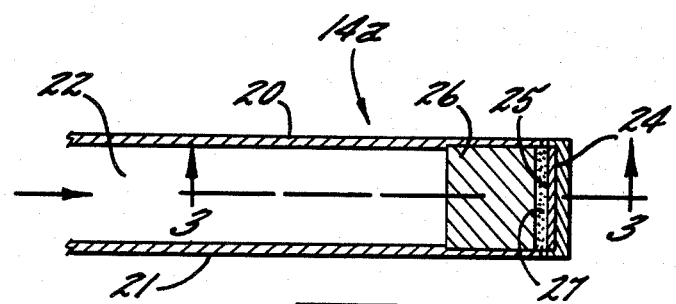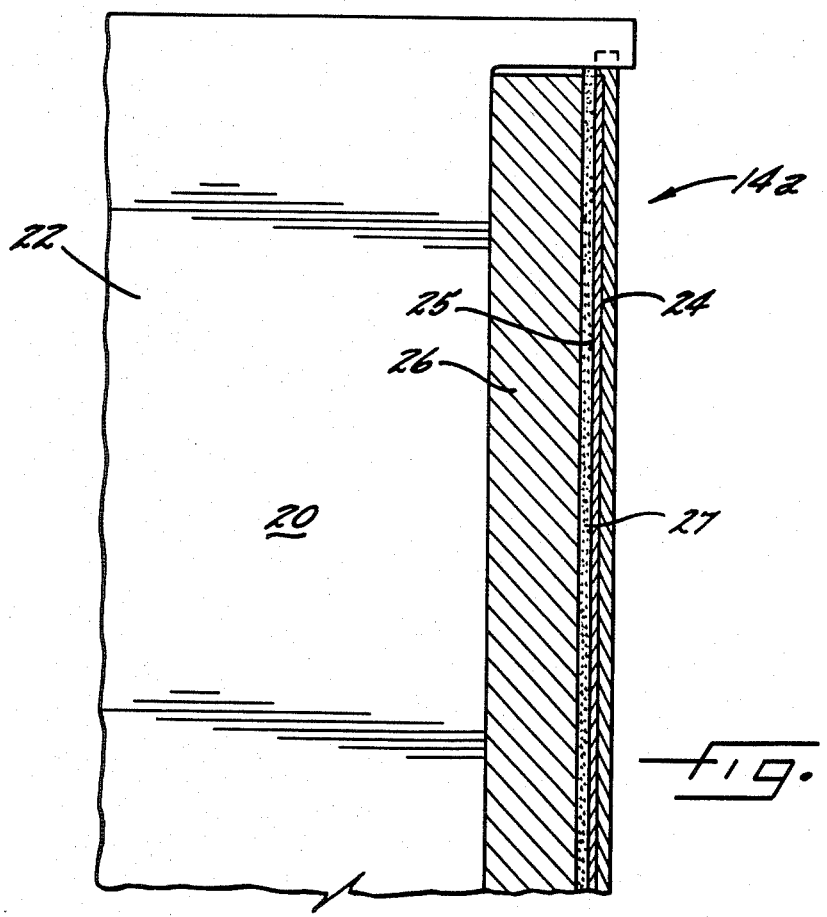

RARE EARTH CERAMIC SCINTILLATOR

This invention relates to X-ray detectors and more particularly to the class of X-ray detectors which have come to be known as solid state.

Detectors of this sort have an important use in CT scanners, although it is expected that they will also find use in fields of gamma and nuclear radiation detection, as well as in the developing field of computed radiography.

Scintillators or scintillation detectors have long been in use as detectors of penetrating radiation, such uses including counting applications and imaging applications. When used in counting applications, the paramount requirement is to produce a sharp pulse of radiation in response to receipt of a high energy photon, such that a coupled photomultiplier can produce a sharp pulse for counting. Imaging applications such as image intensifiers can be characterized as qualitative (analog) rather than quantitative (digital) imaging systems such that resolution is an important characteristic, but detection accuracies of a few percent are satisfactory, and afterglow and hysteresis are not serious problems.

Insofar as we are aware, computed tomography is the first truly quantitative commercial imaging technique. As such, it requires detection accuracies on the order of one part in one thousand for successive measurements taken at a relatively high rate. In contrast to counting techniques, CT detector channels produce signals which are linear and are subsequently integrated by electronics to produce an electrical signal which is related to the incident radiation.

Early generations of scanners acquired data at a relatively low rate and thus did not overly tax the detectors. Such scanners used a comparatively slow translate rotate scanning motion with one or a comparatively few detector channels producing signals during the course of a translation. The detector was typically a scintillating crystal coupled to a high gain photomultiplier which provided significant gain for the detected signal.

More modern generations of CT scanners have evolved to the rotate-only scanning motion in order to achieve the fast scanning speeds which are desirable for head scanning and virtually essential for body scanning. A very successful CT detector in this latter category is described and claimed in the following U.S. patents: Whetten et al. U.S. Pat. No. 4,031,396; Shelley et al. U.S. Pat. No. 4,119,853 and Cotic et al. U.S. Pat. No. 4,161,655. That type of detector uses xenon gas under high pressure and operates on the principle of detecting X-rays by their proportional ionization of the xenon gas. The ionization charge in the xenon gas is collected in an electric field established by spaced parallel tungsten plates and the charge collected is proportional to the number of X-rays absorbed in the gas.

While high pressure xenon detectors of that type have met with considerable success, certain improvements would be of even further benefit to the CT art. The quantum detection efficiency is limited to about 50-70% because a thick window is needed to contain the high pressure gas. In addition, the need for two collimator plates (signal and bias) per cell lowers detection efficiency. Some high energy X-rays can penetrate the xenon gas and escape detection. Finally, the electric field maps at the front of the detector cause some of the ions to pass to the front window and avoid collection at the signal plates.

While the aforementioned problems are not insurmountable in producing a practical xenon detector, adoption of a solid state approach can avoid many of the consequences. However, in applying a scintillation detector to a high resolution fast scanning system, an array of problems not encountered in the early generation of CT scanners or in the counting or qualitative imaging techniques must be faced.

First of all because of the large number of closely spaced detector channels in modern scanners, the use of photomultipliers and their associated high voltage power supplies is impractical. As a result, photodiodes are typically used to transform the scintillated radiation to an electrical signal. Because the photodiodes can provide little, if any, amplification, the efficiency of the scintillator is much more important than in the early scanners.

In addition, many of the solid state detectors which have been discussed for commercial high speed, high resolution scanners suggest the use of monocrystalline scintillators. That implies the ability to bring the scintillator material above its melting temperature, and to grow ingots from the melt of dimensions larger than that of each detector channel. Considering the size, and particularly the length, of the bars required, and the temperatures involved, the process is difficult in and of itself. In addition, some materials exhibit phase changes while cooling, which would cause the crystals to crack when cooled after the growing process. Furthermore, single crystals tend to be susceptible to the propagation of lattice defects along the crystal planes leading to increased afterglow and hysteresis as well as to unwanted cleaving and breaking of bars during lapping and polishing of scintillator bars.

Another problem arises in growing such crystals, because virtually all of the high radiant efficiency scintillators are of the doped or activated variety. Accordingly, it is necessary to control the dopant spatial uniformity as well as the optimum concentration during crystal growth. In addition to those problems, the required purity of the base material leads to an almost prohibitive cost for a high resolution CT detector.

Insofar as we are aware, there are approximately five scintillators which have been commercially used in CT applications, and all are single crystals grown from the melt. They are: NaI:Tl, $CaF_2$:Eu, BGO, CsI:Tl and $CdWO_4$.

The first three are rarely used in modern scanners for the following reasons:

NaI:Tl has a very serious afterglow problem and is highly hygroscopic. Its emission peak wavelength of 410 nm is too low for efficient response from silicon or other good photodiodes.

$CaF_2$:Eu has a very low stopping power. Again, its 435 nm emission is somewhat low for optimum photodiode response.

BGO suffers from too low a radiant efficiency (only 1.2%) and is relatively expensive.

The remaining two single-crystal scintillators are still widely used in CT but have several deficiencies nevertheless. CsI:Tl has a serious problem with hysteresis. That is to say, its light output depends upon its irradiation history and varies from one bar to another. This makes accurate reconstruction of the image very difficult. Further problems with CsI:Tl relate to its high thermal expansion coefficient and low mechanical strength. If the components inside a CT detector cell expand differentially by only a few tens of parts per million, the resulting mechanical deformations can cause artifacts in the image. Additionally, CsI:Tl is hygroscopic, toxic and expensive in the ultra-high purity required to reduce hysteresis and obtain low afterglow.

For the above reasons, the most recently discussed CT scanners suggest the use of $CdWO_4$, but even this has problems. $CdWO_4$, like BGO and other unactivated scintillators, has a low (2.5–3.0%) radiant efficiency. This allows the signal output and noise to become comparable to the electronic noise, resulting in a degraded signal. Furthermore, $CdWO_4$ has a tendency to cleave apart like mica when it is cut, making it very difficult to obtain undamaged bars. Finally, $CdWO_4$ is expensive and difficult to obtain commercially, largely due to its high toxicity.

Polycrystalline ceramics have been suggested as alternatives to overcome some of the problems with single crystals (see, for example, Cusano et al. U.S. Pat. No. 4,242,221). While the approach suggested there overcomes some of the difficulties of the monocrystalline approach, it is believed that the scintillators which are achieved would be unacceptable for some purposes. First of all, in the case of 4 of the 5 crystal types mentioned, the crystal geometry not being cubic causes refractions at the lattice boundries, with a lengthening of the optical path and an inherent reduction in light output. With respect to the fifth type CsI:Tl, while a cubic crystal structure is produced, the crystal is undesirable for reasons of hysteresis, afterglow and hygroscopicity.

Accordingly, it is an object of the present invention to provide an improved solid state detector having a scintillator crystal with properties more compatible to CT requirements than those used heretofore.

An object according to the present invention is to provide a scintillator which has high X-ray stopping power, and at the same time high radiant efficiency and good transparency. Further in that regard, it is an object to provide such a scintillator with afterglow and hysteresis characteristics compatible with high resolution fast CT scanning.

According to a more detailed aspect of the invention, it is an object to provide a scintillator which is negligibly hygroscopic, having high chemical stability, and one not requiring ultra high purity materials. Further in that regard, it is an object to provide a scintillator having low thermal expansion, high mechanical strength and resistance to cleavage.

In accomplishing these objects, we have found that rare earth compounds can be configured in a manner to be described in detail below to provide characteristics which are very compatible with CT requirements. Since most of the rare earth compounds have very high X-ray stopping power, the crystals need not have extreme thicknesses in order to effectively stop the incident radiation. Many of the rare earth compounds, when processed in the manner to be described, produce cubic crystal structures which are optically isotropic, that is, they exhibit the same refractive index in all directions. As a result, the emitted light will not refract at the crystal grain boundries, and transparency and light output are enhanced.

However, producing monocrystalline scintillators from rare earth or doped rare earth compounds presents an array of problems which tend to overshadow the above described desirable characteristics. The characteristics of high melting temperature, possible phase changes during cooling, and non-uniform activator concentrations described above can all come into play.

We have discovered that the desirable properties of rare earth oxide scintillators can be achieved while avoiding the difficulties associated with the monocrystalline approach to produce a scintillator having characteristics compatible with modern CT requirements. More particularly, rare earth oxides doped with rare earth activators can be processed as described below to produce a polycrystalline ceramic scintillator having characteristics very compatible with modern CT or other digital imaging requirements.

Other objects, advantages and features of the invention will become apparent from the following detailed description when taken in conjunction with the drawings, in which:

FIG. 1 is a partly schematic view illustrating the elements of a CT scanner incorporating the present invention;

FIG. 2 is an end elevation showing one of the detector channels of the detector of FIG. 1; and FIG. 3 is a sectional view taken along the line 3—3 of FIG. 2.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Turning now to the drawings, FIG. 1 shows the elements of a CT scanner involved in the production, transmission and detection of X radiation. The scanner includes a source of penetrating radiation 10, very often in the form of a rotating anode X-ray tube. The radiation produced by the X-ray tube 10 is collimated at 11 to produce a thin fan beam of radiation 12 which is projected through a patient aperture 13 toward an X-ray detector array 14. A body to be examined, such as a patient 15, is positioned within the patient aperture 13 in the path of the fan beam of X-rays 12 such that the beam passing through the body is attenuated in dependence on the density of the objects encountered. As a result, each detector cell 14a, 14b, etc. produces an electrical signal which is dependent on the intensity of the radiation received within the cell. The signals thus produced are therefore measures of the attenuation of the X-ray beam by the portion of the body through which it passed.

In operation, readings are taken from each cell at a plurality of angular positions with respect to the patient, as the source and detector array are rotated about the patient aperture. The readings thus produced are digitized and fed to a reconstruction computer 16 which can use one of a number of available algorithms to compute the picture of the cross section traversed by the fan beam. The picture is displayed on a CRT 17, or alternatively can be used to create a film or the like for further study by a diagnostician.

FIG. 1 shows a scanner geometry which has come to be known as rotate-rotate, in which the source is fixed with respect to the detector array, and they rotate in unison around the patient aperture. Detector cells constructed in accordance with this invention are highly desirable for such an array because it requires very close cell spacing (at least at the central cells) in order to achieve the high spatial resolution of which it is capable. However, the detector cells taught herein are also useful in other types of CT scanner geometries, including the rotate only geometry using a fixed detector ring.

Turning to FIGS. 2 and 3, there is shown the configuration of a single cell 14a of the detector array 14. The cell width is defined by a pair of collimator plates 20, 21 which define a window 22 for receiving X-rays along an incremental portion of the fan beam 12 which it faces. A comparison of FIGS. 2 and 3 will show that the cell length (that is, the dimension perpendicular to the plane of the fan) is considerably greater than the cell width. It is important to minimize the cell width in order to get good spatial resolution (i.e., break the fan into as many channels as possible). Typical dimensions in a practical array can be about 2 mm. for the cell width, while the scintillator can be approximately 20 mm. in length, approximately 15 mm. of which is exposed to radiation.

In operation, radiation passing between the collimator plates and impinging on the scintillator is converted into lower energy radiation in the visible or near-visible spectrum. Means are provided for responding to this lower energy radiation and producing a signal proportional to it and therefore proportional to the intensity of X radiation initially received. In the illustrated embodiment, a photodiode assembly 24 is mounted behind the scintillator 26 and has an active surface 25 underlying the scintillator 26 and adapted to receive the radiation which it produces.

Various means are available for directing the light produced by the scintillator 26 to the active surface of the diode. For example, the faces of the scintillator (with the exception of the face adjacent the diode) can be treated to reflect inwardly. In addition, optical coupling material 27 can be applied between the diode and associated scintillator face to enhance coupling of the scintillator to the diode.

In any event, however, these measures are of little use if the scintillator (a) is not an efficient converter of X radiation, (b) has poor optical transmittance and thus absorbs the light produced rather than transmits it to the diode, or (c) emits radiation at a wavelength not compatible with the response characteristics of the diode.

In accordance with the invention, a class of scintillator elements are provided having superior light transmittance, having good conversion efficiency, and adapted to produce light at a wavelength compatible with available photodiodes. This class of scintillators is of further benefit because they are not monocrystalline as in the case of the scintillators typically used heretofore, but are polycrystalline ceramics having superior physical properties, and are thus more easily adapted to the physical requirements of long and reliable life in a CT scanner.

First of all, the scintillator base material is a rare earth oxide. Such materials are available in sufficiently pure form at reasonable expense and can be processed as described below to produce several desirable properties. Secondly, the scintillator is produced by sintering or hot pressing techniques to form a polycrystalline ceramic. As a result, the manufacturing process is not overly expensive, and the resultant product is easily cut, polished, machined or the like to produce scintillator bars of the desired size. In addition, the polycrystalline ceramic can be formed by a process which yields a ceramic having a porosity no greater than about 0.1%. As a result, the material is very dense and has a very high X-ray stopping power. Referring to FIG. 2, polycrystalline ceramics which are only about 2 mm. in depth can produce equivalent stopping power to conventionally used monocrystalline NaI:Tl, of about 4 mm depth. Thus, crystals can be produced which are of only half the volume of conventional crystals, considerably shortening the path to be traveled by at least some of the light energy. Polycrystalline ceramics can be produced according to the invention having depths of 2 to 10 mm and having a stopping length of about 0.2 to 1 mm.

A third important point in configuring a scintillator according to the present invention is to select one of the rare earth oxides and process it in such a way that it retains a cubic crystal structure. Cubic materials are optically isotropic, that is, they have the same refractive index in all directions. In non-cubic ceramics, the scintillated light would refract hundreds of times as it crossed the crystal grain boundaries, resulting in long optical paths and concurrent absorption, and also would impinge frequently on non-perfect reflective channel walls (about 95%) and be decreased about 5% at each such bounce before being detected by the photodiode. This is not so with cubic crystals, which therefore are characterized by greater optical clarity and light output. In practicing this invention, polycrystalline ceramics can be produced having linear optical attenuation coefficients at which they scintillate of no more than 100 $cm^{-1}$ and preferably less than 30 $cm^{-1}$.

Finally, the rare earth oxide, before being formed into a polycrystalline ceramic, is doped with a rare earth activator which is adapted to cause the scintillator to convert incident radiation into light at a wave length compatible with available photosensitive devices and at a reasonable conversion efficiency.

Of the rare earth oxides we have studied, we currently prefer $Gd_2O_3$ for a number of reasons. First of all, over the energy range most typically encountered in diagnostic radiology, $Gd_2O_3$ has a stopping power even higher than that of lead. Secondly, $Gd_2O_3$ can be formed into a polycrystalline ceramic of almost 100% theoretical density using the ceramic techniques of hot pressing. The hot pressing process can be controlled to assure that the polycrystalline ceramic retains a cubic crystal geometry so as to maximize optical transmittance. Sintering of pure $Gd_2O_3$ seems to lead to the formation of a monoclinic crystal structure, which is a somewhat less efficient host structure for efficient activation. Additionally, proper selection of the rare earth activator can result in good radiation efficiency. For example, when doped with europium, $Gd_2O_3$ has a radiation efficiency of about 11% to 12%.

Because the product produced by the sintering or hot pressing technique is a ceramic, it has good mechanical properties and can easily withstand the cutting, polishing, mounting and the like associated with incorporating a bar of predetermined relatively tight toleranced dimensions into a CT scanner. In its ceramic form, the material has good chemical stability and is not hygroscopic.

The conversion characteristics of the ceramic, such as wave length, speed, afterglow, hysterisis and the like depend to a large extent on the particular rare earth activator which is used. When europium is used in an optimum concentration of about 2 to 6 mole percent, the principal emission wavelength is about 611 nm, which is very near the peak response of PIN photo diodes which are used in CT applications. All characteristics are acceptable for CT or DR applications. The primary decay speed is on the order of 1000 microseconds (approximately 900 microseconds for pure $Gd_2O_3$), and can be reduced by increased europium concentration or co-doping with ytterbium if so desired. There is no hysteresis seen for these rare earth scintillators. Finally, the afterglow can be effectively reduced, if present, by co-doping with ytterbium or other materials (see, for example, concurrently filed Cusano et al. U.S. patent application Ser. No. 389,812.

Other rare earth activators are also useful both with $Gd_2O_3$ and with other of the rare earth oxides to be discussed below. Among the activators yielding high light photon efficiencies are neodymium, ytterbium and dysprosium. The principal emission wavelengths of $Gd_2O_3$ ceramics using neodymium or ytterbium activators is in the infrared region. Thus, while the relative light photon efficiency is fairly high, because currently available PIN photodiodes are most responsive in the red region, the overall detector efficiency is somewhat reduced. However, it is possible to secure diodes having peak efficiencies nearer the infrared region, to improve the overall cell efficiency. Ceramics doped with dysprosium produce their principal emission at about 572 nm which is in the yellow region, and which couples quite effectively to PIN photodiodes presently used.

With respect to the three alternative rare earth activators, the optimum concentrations are: neodymium 0.05 to 1.5 mole percent; ytterbium 0.1 to 2 mole percent; and dysprosium 0.03 to 1 mole percent. In all three cases, the primary decay speed is much better than that achieved with europium, although at the expense of some conversion efficiency. In each case, however, the physical characteristics of the scintillator are like those described in connection with the europium doped scintillator, and thus are very adaptable for use in a CT scanner.

In addition to $Gd_2O_3$, other of the rare earth oxides, when doped with a rare earth activator, have characteristics which are attractive in a CT scanner. (It is noted that when rare earth oxides are used herein, it is intended to cover not only the lanthanides, but also yttrium, which is sometimes categorized as a rare earth although not within the lanthanide series.) With respect to alternate rare earth oxides, the crystallographic and scintillation properties of $Y_2O_3$ are found to be similar (but not identical) to $Gd_2O_3$. One drawback associated with $Y_2O_3$, however, is that the stopping power is several times lower than $Gd_2O_3$ (at 73 kev), thus requiring a substantially thicker crystal and somewhat less optimum channel design for optimum light collection.

Other rare earth oxides, found to have crystallographic properties similar to $Gd_2O_3$ and scintillation properties beneficial to CT are $La_2O_3$ and $Lu_2O_3$. These oxides are useful because they both have high X-ray stopping power, comparable to or better than $Gd_2O_3$. An additional advantage of $Lu_2O_3$ is that it possesses a cubic crystal structure and can be made transparent by sintering as well as by hot pressing. A disadvantage of $Lu_2O_3$, however, is cost.

While scandium has crystalligraphic and scintillation properties which are similar to yttrium, lanthanum and lutetium, and is normally included in the broad definition of a rare earth element, it has the disadvantage of having a relatively low atomic number and would therefore not likely be of use for X-rays in the energy range normally used in diagnostic radiology.

The rare earth phosphors according to this invention can be formed into polycrystalline ceramics by using various of the techniques described in the aforementioned Cusano et al. application Ser. No. 389,812, the disclosure of which is incorporated herein by reference. Generally, it is first necessary to form a powder containing the desired constituents in the appropriate amounts. This can be accomplished simply by milling a mixture of powders containing the constituents, or by employing a wet chemical oxalate method.

One of the ceramic techniques which can be used to form very dense polycrystalline ceramics is vacuum hot pressing. For $Gd_2O_3$, our preferred host material, the temperature should be limited to below 1250° C. in order to assure a cubic crystalline structure. It is known that if the material is raised above 1250° C., when it cools below that temperature a cubic to monoclinic transformation takes place, hindering transparency and producing less efficient scintillators. In applying vacuum hot pressing techniques, it is preferred to subject the material to a pressure of about 1000 to 1200 psi at a temperature in the range of 600° C. to 700° C. in a vacuum of less than 200 microns for a period of about 1 hour. The pressure is then raised to the range of 4000 to 10,000 psi and the temperature to the range of 1300° C. to 1600° C. There conditions are maintained for a period of about ½ to 4 hours, then released allowing the furnace to cool to room temperature.

In cases where sintering techniques are desirable, it is necessary to raise the temperature to from 1500° C. to 2100° C., well above the aforementioned 1250° C. for hot-pressed $Gd_2O_3$. To achieve transparent cubic scintillators containing $Gd_2O_3$ by employing the sintering technique, it is necessary to incorporate sufficient $Y_2O_3$ to allow the material to remain cubic in cooling from the sintering temperature to room temperature. Incorporation of over 50 mole percent $Y_2O_3$ is necessary, and it assures that the crystal structure will remain cubic. What has been said about $Gd_2O_3$ holds generally for $La_2O_3$, as it is also a non-cubic material.

We claim:

1. In a radiation detector for use with a source of penetrating radiation, a detector array having a plurality of channels for receiving the radiation, the channels each including a scintillator and a photo-responsive means coupled thereto for producing a set of signals related to the radiation detected in the respective channels, the improvement wherein each scintillator comprises a polycrystalline ceramic scintillator crystal for detecting the radiation in the channels, the crystals being formed of a rare earth oxide doped with a rare earth activator to form a cubic crystal structure which scintillates at a predetermined wavelength, the crystal having a porosity no greater than about 0.1% and being substantially optically transparent to efficiently couple the scintillated radiation to the photo-responsive means.

2. The improvement as set out in claim 1 wherein the polycrystalline ceramic scintillator crystal has a depth in the direction of the radiation between about 2 and 10 millimeters and a stopping length in the range between about 0.2 and 1.0 millimeters.

3. The improvement as set out in claim 1 wherein the rare earth oxide is selected from the group consisting of $Gd_2O_3$, $Y_2O_3$, $La_2O_3$ and $Lu_2O_3$.

4. The improvement as set out in either of claims 1 or 3 wherein the rare earth activator is selected from the group consisting of europium, neodymium, ytterbium and dysprosium.

5. The improvement as set out in claim 1 wherein the rare earth oxide is gadolinium oxide ($Gd_2O_3$) and the rare earth activator is europium.

6. The improvement as set out in claim 1 wherein the rare earth oxide is gadolinium oxide ($Gd_2O_3$) combined with yttrium oxide ($Y_2O_3$) and the rare earth activator is europium.

7. In a radiation detector for use with a source of penetrating radiation, an X-ray detector having a plurality of collimated cells for detecting X-radiation projected into the cells and for producing sets of electrical signals to be integrated as a measure of incident radiation, the improvement comprising a plurality of polycrystalline ceramic scintillators in the cells for detecting the radiation impinging thereon, the crystals being formed of a rare earth oxide doped with a rare earth activator to form a cubic crystal structure which scintillates at a predetermined wavelength, the crystal having a porosity no greater than about 0.1% and being substantially optically transparent.

8. The improvement as set out in claim 7 wherein the ceramic scintillator has a linear optical attenuation coefficient at said predetermined wavelength of no more than 30 centimeters$^{-1}$.

* * * * *